US010094325B2

(12) United States Patent
Favaron

(10) Patent No.: US 10,094,325 B2
(45) Date of Patent: Oct. 9, 2018

(54) CYLINDER LINER

(71) Applicant: ZYNP International Corp., Romulus, MI (US)

(72) Inventor: Rodrigo Favaron, Romulus, MI (US)

(73) Assignee: ZYNP INTERNATIONAL CORP., Romulus, MI (US)

(*) Notice: Subject to any disclaimer, the term of this patent is extended or adjusted under 35 U.S.C. 154(b) by 0 days.

(21) Appl. No.: 15/391,943

(22) Filed: Dec. 28, 2016

(65) Prior Publication Data

US 2017/0107933 A1 Apr. 20, 2017

Related U.S. Application Data

(63) Continuation-in-part of application No. 14/608,180, filed on Jan. 28, 2015.

(60) Provisional application No. 61/932,471, filed on Jan. 28, 2014.

(51) Int. Cl.

| | |
|---|---|
| ***F16J 10/04*** | (2006.01) |
| ***F02F 1/00*** | (2006.01) |
| ***B22D 13/00*** | (2006.01) |
| ***B22D 21/00*** | (2006.01) |
| ***B22D 25/02*** | (2006.01) |

(52) U.S. Cl.
CPC .............. *F02F 1/004* (2013.01); *B22D 13/00* (2013.01); *B22D 21/007* (2013.01); *B22D 25/02* (2013.01)

(58) Field of Classification Search
CPC ...... B22D 13/00; B22D 21/007; B22D 25/02; F02F 1/004; F02F 2200/06
USPC .................. 123/193.2; 92/171.1; 29/888.06, 29/888.072
See application file for complete search history.

(56) References Cited

U.S. PATENT DOCUMENTS

| | | | | |
|---|---|---|---|---|
| 5,179,994 | A | 1/1993 | Kuhn | |
| 7,226,667 | B2 * | 6/2007 | Kodama | B22D 19/0009 123/193.2 |
| 8,037,860 | B2 | 10/2011 | Takami et al. | |
| 2002/0134128 | A1 * | 9/2002 | Koyama | B22D 19/00 72/253.1 |
| 2003/0010201 | A1 * | 1/2003 | Takahashi | C23C 4/02 92/169.1 |
| 2003/0168197 | A1 * | 9/2003 | Miyamoto | B22D 19/0009 164/111 |
| 2005/0161014 | A1 * | 7/2005 | Komai | B22D 19/0009 123/193.2 |
| 2006/0156917 | A1 * | 7/2006 | Oda | F02F 1/18 92/171.1 |
| 2007/0009669 | A1 | 1/2007 | Miyamoto et al. | |

(Continued)

FOREIGN PATENT DOCUMENTS

| | | | |
|---|---|---|---|
| DE | 10150999 | A1 | 4/2003 |
| DE | 102010042413 | A1 | 4/2012 |

(Continued)

*Primary Examiner* — Marguerite McMahon
*Assistant Examiner* — Tea Holbrook
(74) *Attorney, Agent, or Firm* — Michael E. Dockins; Shumaker, Loop & Kendrick, LLP

(57) ABSTRACT

Cylinder liners, methods of forming the same, and outer surface designs of a cylinder liner having as-cast projections with certain functional shapes are provided. The as-cast projections increase the clamping performance of the cylinder liner and do not result in any air gaps between a cast aluminum block and the cylinder liner.

25 Claims, 11 Drawing Sheets

(56) References Cited

U.S. PATENT DOCUMENTS

| | | | | |
|---|---|---|---|---|
| 2007/0012176 | A1* | 1/2007 | Takami | B22D 19/0009 92/171.1 |
| 2007/0012178 | A1* | 1/2007 | Takami | B22D 19/0009 92/171.1 |
| 2007/0012179 | A1* | 1/2007 | Takami | B22D 19/0009 92/171.1 |
| 2007/0012180 | A1* | 1/2007 | Miyamoto | B22D 19/0009 92/171.1 |
| 2007/0209627 | A1* | 9/2007 | Bing | B22D 19/0009 123/193.2 |
| 2007/0240652 | A1* | 10/2007 | Michioka | B22D 19/0009 123/41.84 |
| 2009/0272261 | A1* | 11/2009 | Sato | B22D 19/0009 92/169.1 |
| 2010/0059012 | A1* | 3/2010 | Tachibana | F02F 1/004 123/193.2 |
| 2010/0101526 | A1* | 4/2010 | Schaefer | C23C 4/02 123/193.2 |
| 2010/0162886 | A1* | 7/2010 | Choi | B22D 13/023 92/169.4 |
| 2012/0048106 | A1* | 3/2012 | Horigome | B22D 19/0009 92/171.1 |
| 2012/0304852 | A1* | 12/2012 | Yamagata | B22D 15/02 92/169.4 |
| 2014/0014059 | A1* | 1/2014 | Takada | C23C 28/30 123/193.6 |
| 2015/0020757 | A1* | 1/2015 | Highum | B22D 19/0081 123/41.01 |
| 2015/0122118 | A1* | 5/2015 | He | C23C 4/04 92/171.1 |

FOREIGN PATENT DOCUMENTS

| | | | | |
|---|---|---|---|---|
| EP | 0919715 A2 | | 6/1999 | |
| EP | 1504833 A1 | | 2/2005 | |
| EP | 2422902 A2 | | 2/2012 | |
| GB | 1399366 A | * | 7/1975 | F02F 1/08 |
| GB | 1421284 A | * | 1/1976 | F16J 10/04 |

* cited by examiner

CYLINDER LINER

CROSS-REFERENCE TO RELATED APPLICATION

This application is a continuation-in-part of U.S. patent application Ser. No. 14/608,180 filed on Jan. 28, 2015, which claims the benefit of priority of U.S. Provisional Patent Application Ser. No. 61/932,471 filed on Jan. 28, 2014. The entire disclosures of the above applications are incorporated herein by reference in their entireties.

FIELD OF THE INVENTION

The present technology relates to cylinder liners and, more particularly, to an outer surface design of a cylinder liner having as-cast projections with certain functional shapes.

BACKGROUND OF THE INVENTION

This section provides background information related to the present disclosure which is not necessarily prior art.

In aluminum cylinder blocks for engines of automobiles (hereinafter referred to as cylinder block), cylinder liners (hereinafter sometimes referred to as liner) made of cast iron are often used in order to satisfy desired seizing resistance and wear resistance of a sliding surface. As a method for producing the cylinder block having the liner enveloped or embedded therein, a method for enveloped casting has been known wherein a liner is placed within a cast mold for the cylinder block and the periphery of the liner is enveloped with aluminum or an aluminum alloy (hereinafter referred to as an aluminum material).

In such a liner, it is required to secure adhesion between the outer face of the liner and the aluminum material to prevent the liner from rotating at the time of processing the inner face of the liner after the enveloped casting or to improve the engine performance by the reduction in the deformation of bores and the improvement of thermal conductivity. The following methods have been known to obtain a liner having a high adhesion with the aluminum material:

(1) a method wherein shot peening is applied to the outer face of the liner to provide irregularities on the outer face, thereby improving the adhesion (JP-B-2-29426);
(2) a method wherein spinies (acicular special cast surface) are formed on the outer face of the liner to improve the adhesion (JP-B-43-4842);
(3) a method wherein grooves in an axial direction are formed by machining the outer face of the liner to improve the casting properties of the block and the adhesion (JP-A-8-290255); and
(4) a method wherein blast finishing is applied to the cast iron surface of the outer face of the liner. It has been known that the cast iron surface in this case is obtainable by a permanent mold centrifugal casting method or the like wherein a suspension containing from 20 to 40 mass % of diatomaceous earth having a mean particle size of not more than 0.1 mm, from 2 to 10 mass % of bentonite and from 65 to 80 mass % of water, is coated by spraying on the cast mold, and after drying it, a melt of cast iron is poured thereinto.

However, the above methods (1) to (4) have the following drawbacks. For example, with the shot peening in the above method (1), the adhesion is insufficient, and further, since a soft ferrite structure is required to exist in a thickness of at least 2.0 mm, the thickness tends to increase. In the above method (2), although the adhesion is good, the irregularities on the outer face is at a level of about 1.0 mm and the thickness increases, and further, the filling property of the aluminum material into the dents of spinies is poor. In the machining of grooves in the above method (3), the thickness tends to increase entirely in order to secure the strength at the bottom of groove, and the cost tends to be high. The above method (4) obtainable by blasting the cast iron surface has drawbacks, e.g. poor adhesion, although the filling property of the aluminum material is good and the price is low.

It would be desirable to develop a cylinder liner having a high clamping performance between the cylinder liner and an associated engine block.

SUMMARY OF THE INVENTION

Concordant and congruous with the present technology, a cylinder liner having a high clamping performance between the cylinder liner and an associated engine block.

In certain embodiments, a cylinder liner is provided that includes a plurality of as-cast projections formed on an exterior surface thereof, where a portion of the as-cast projections including a member selected from the group consisting of: (a) projections having a lightbulb-like shape with a first diameter adjacent to the surface of the cylinder liner, a second diameter spaced apart from the first diameter and terminating at an end of the projection, and a third diameter therebetween less than the first and the second diameters; (b) conjoined projections, each of the conjoined projections including a plurality of peaks, each peak sharing a shoulder with another peak; (c) vermicular projections, each of the vermicular projections having a cross-section substantially planar to the exterior surface that is non-circular; and (d) combinations thereof. The portion of the as-cast projections can include at least two of (a), (b), and (c). The portion of the as-cast projections can also include each of (a), (b), and (c).

In certain embodiments, a cylinder liner is provided that includes a plurality of as-cast projections formed on an exterior surface thereof, where a portion of the as-cast projections are conjoined projections. Each of the conjoined projections includes a plurality of peaks. Each peak shares a shoulder with another peak. The portion of the as-cast projections that are conjoined projections can include from about one-quarter of a total number of the plurality of as-cast projections to substantially all of the as-cast projections. The conjoined projections can include conjoined projections having various numbers of peaks, including at least three peaks and at least four peaks. A lowest point of the shoulder shared between the peak and the another peak can range from about one-quarter to about three-quarters of a height of one of the peak and the another peak.

In certain embodiments, a cylinder liner is provided that includes a plurality of as-cast projections formed on an exterior surface thereof, where a portion of the as-cast projections are vermicular shapes. Each of the vermicular shapes has a cross-section substantially planar to the exterior surface that is non-circular. The cross-section, for example, can be multi-lobed and can be elongate and curved. The portion of the as-cast projections being vermicular shapes can include from about one-quarter of a total number of the plurality of as-cast projections to substantially all of the as-cast projections.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

The drawings described herein are for illustrative purposes only of selected embodiments and not all possible implementations, and are not intended to limit the scope of the present disclosure.

DETAILED DESCRIPTION OF EXEMPLARY EMBODIMENTS OF THE INVENTION

Figure 1:
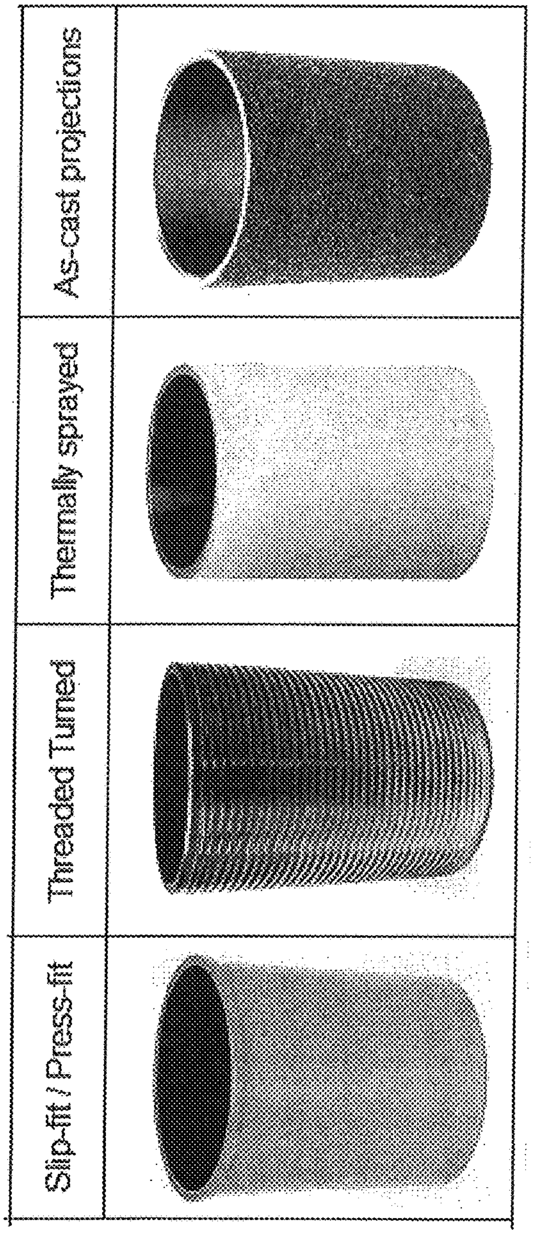
FIG. 1 is a photographic side-by-side comparison of prior art cylinder liners as compared to a cylinder liner according to embodiments of the present technology.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments. Except where otherwise expressly indicated, all numerical quantities in this description are to be understood as modified by the word "about" and all geometric and spatial descriptors are to be understood as modified by the word "substantially" in describing the broadest scope of the technology.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, all compositional percentages are by weight of the total composition, unless otherwise specified. Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9,1-8,1-3,1-2,2-10,2-8,2-3,3-10,3-9, and so on.

In an embodiment of the present technology, a method of forming a cylinder liner having as-cast projections is disclosed. The method involves a centrifugal casting process of a cylinder liner. During the centrifugal casting, a coating is formed on the casting mold. The coating is formed from a porous material that results in the as-cast projections due to the pores on a surface of the coating that contact and entrain a portion of a molten metal poured thereon and in contact therewith. The density, toruosity, degree of porosity, and thickness of the porous material determines the height, shape, and density of the as-cast projections formed on the cylinder liner.

A molten metal having a desired composition is then poured into the mold onto the coating. The molten metal may be formed by aluminum, a gray cast iron (GCI), a GCI/aluminum alloy, or another alloy, as desired. In the event that the engine block is formed from aluminum, molten metal of aluminum is preferred to form the cylinder liner. The molten metal may also be formed from an austempered ductile cast iron (ADI) similar to that disclosed in commonly-owned U.S. patent application Ser. No. 14/608,169 filed on Jan. 28, 2015, and the cylinder liner can include aspects of U.S. patent application Ser. No. 14/608, 164 filed on Jan. 28, 2015, where the entire disclosure of each is incorporated herein by reference.

Figure 7:
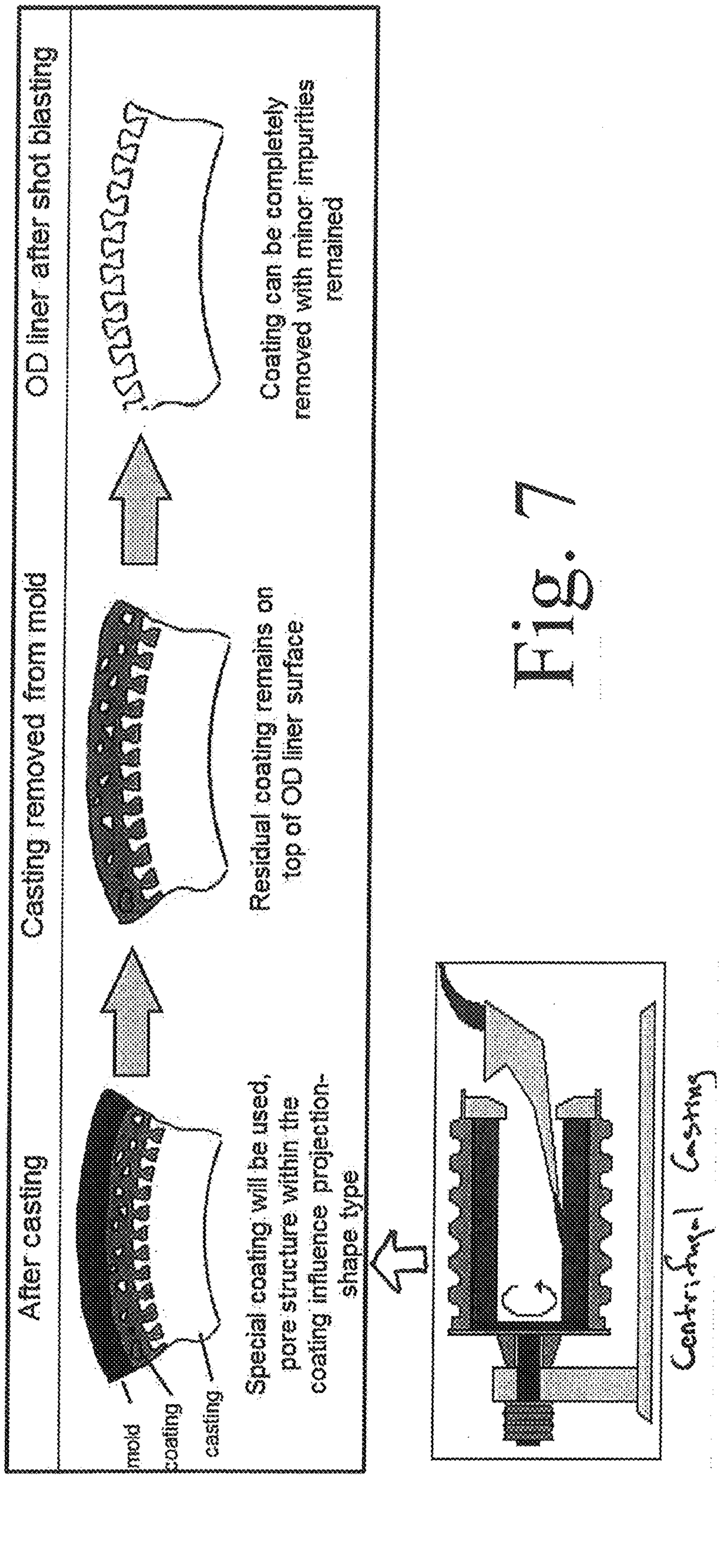
FIG. 7 is a flow chart of a process for forming a cylinder liner having as-cast projections formed thereon according to an embodiment of the present technology.

The molten metal-covered coating is processed using a centrifugal casting process. Once the centrifugal casting is completed, the cylinder liner having the coating there on is removed from the mold. The coating is removed from the cylinder liner using a shot blasting process to result in the cylinder liner having an outer surface (or outer diameter, OD) substantially free from the material of the coating and having as-cast projections formed thereon. The process is illustrated in FIG. 7. It is understood that the coating may be removed using a sand blasting process, a chemical removal step, or any suitable process for removing the coating.

Figure 2:
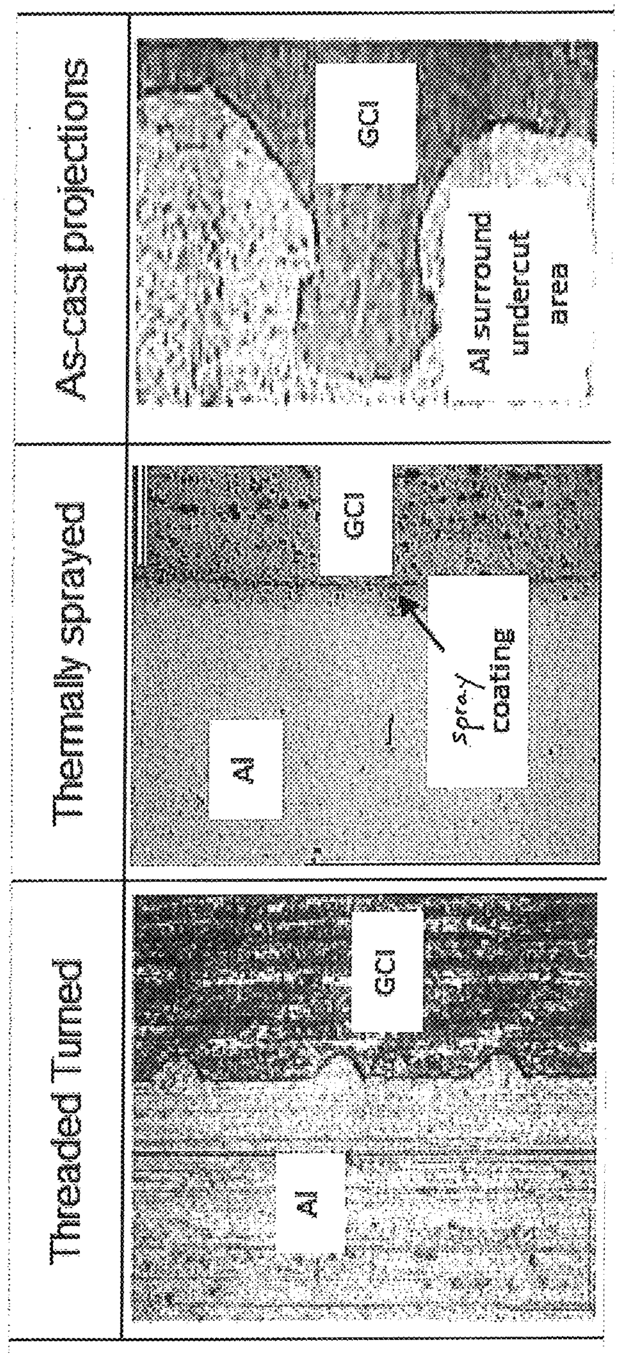
FIG. 2 shows a cross-section of a prior art cylinder of FIG. 1 as compared to the cylinder liner according to the embodiments of the present technology of FIG. 1.
Figure 3:
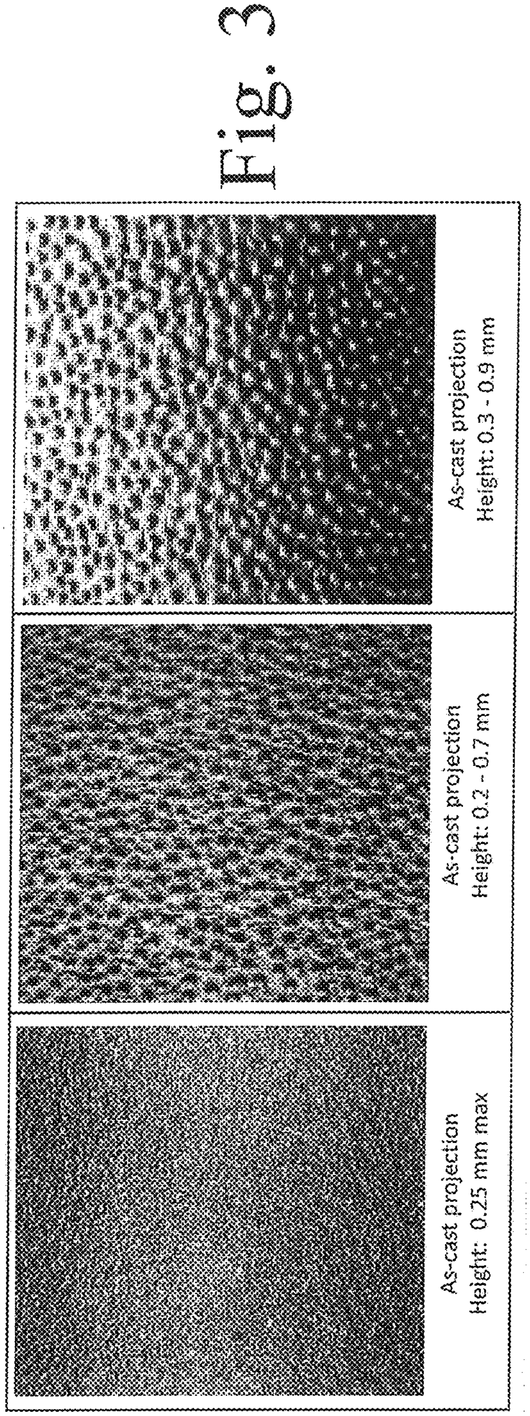
FIG. 3 shows the surface features cylinder liners having different heights of projections according to various embodiments of the present technology.
Figure 3A:
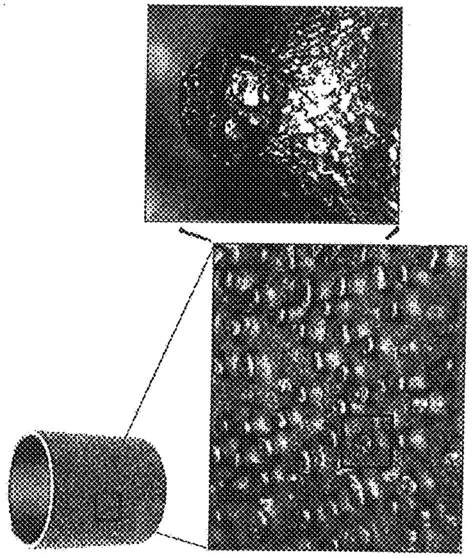
FIG. 3*a* is a photo of a cylinder liner having as-cast projections according to an embodiment of the present technology that includes an enlarged portion to show a plurality of the as-cast projections, and a further enlarged portion showing a single as-cast projection.

FIG. 1 is photographic side-by-side comparison of prior art cylinder liners as compared to a cylinder liner according to embodiments of the present technology. An external surface of the cylinder liner has a rough texture as compared to the slip/press-fit cylinder liner, a threaded turned cylinder liner, and a thermally sprayed cylinder line. FIG. 2 shows a cross-section of a prior art cylinders of FIG. 1 as compared to the cylinder liner according to the embodiments of the present technology. FIG. 2 further demonstrates the undercut effect of the as-cast projections and how the projections lock the cylinder liner into place due to being surrounded by material (in the case of FIG. 2, the surrounding material being aluminum). The as-cast projections of FIG. 2 on the cylinder liner formed from the process above have a substantially lightbulb shape described in more detail hereinbelow. The projections may have a height of up to about 0.25 mm, a height of between about 0.2 and about 0.7 mm, and a height of between about 0.3 and about 0.9 mm. The appearance of the external surface will vary based on a height of the projections as best shown in FIG. 3. An embodiment of the present technology where the as-cast projections have a height of 0.7±0.2 mm and a projection density of about 50±15 projections/$cm^2$ is shown in FIG. 3*a*.

Figure 4:
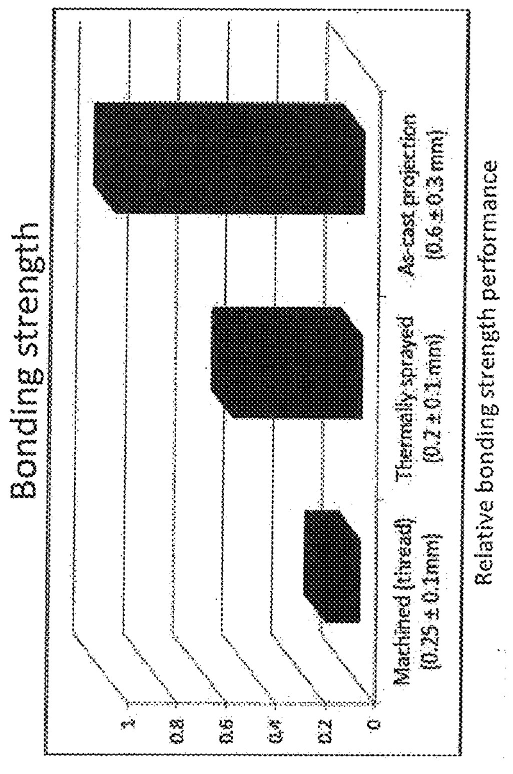
FIG. 4 shows a graph of the technologies of FIG. 2 comparing bonding strength and shear strength thereof.
Figure 4:
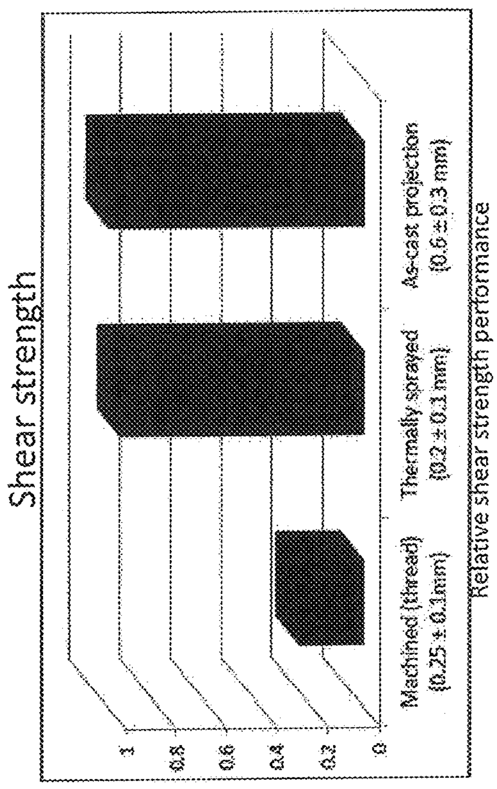

FIG. 4 shows a pair of graphs related to the clamping performance of the cylinder liner having as-cast projections in terms of bonding strength and shear strength as compared to a threaded turned cylinder liner and a thermally sprayed cylinder liner. In the graphs of FIG. 4, the illustrated as-cast projections have a height of 0.6±0.3 mm.

A comparison of chemical composition and mechanical properties of the cylinder liner according to the present technology versus prior a prior cylinder liner is provided in the table below:

| Material comparison | Standard | Threaded material | Inventive material |
|---|---|---|---|
| | Application | Thread | As-cast projection |

-continued

| | | Casting process | Centrifugal | Centrifugal |
|---|---|---|---|---|
| Chemical composition | | Carbon | 3.25-3.50 | about 3.30-about 3.70 |
| | | CE | 3.85-4.4 | abou 4.4 max |
| | | Silicon | 2.25-2.8 | about 2.00-about 2.80 |
| | | Manganese | 0.5-0.9 | about 0.5-about 1.0 |
| | | Phosphorus | 0.2 max | about 0.2 max |
| | | Sulfur | 0.04-0.07 | about 0.12 max |
| | | Chromium | 0.20-0.50 | abou 0.1-about 0.4 |
| | | Copper | 0.5-1.5 | about 0.5 max |
| | | Titanium | 0.04 max | about 0.04 max |
| Micro-structure (wear surface) | Matrix | Fine pearlite | 95% min | about 95% min |
| | | Free ferrite | 5% max | about 5% max |
| | | Free carbide | | |
| | | Steadite | | |
| | Graphite | Type A (size) | 70% min (4-7) | about 70% min (4-7) (+E) |
| | | Type B (size) | remained | remained |
| | | Type D&E (size) | remained | remained |
| Hardness | | As cast (HB) | — | about 207-about 285 |
| | | Finished (HRB) | 93-104 | about 94-about 104 |
| Tensile strength | | MPa (min) | 240 | about 255 |

Figures 5, 5A, 5B:
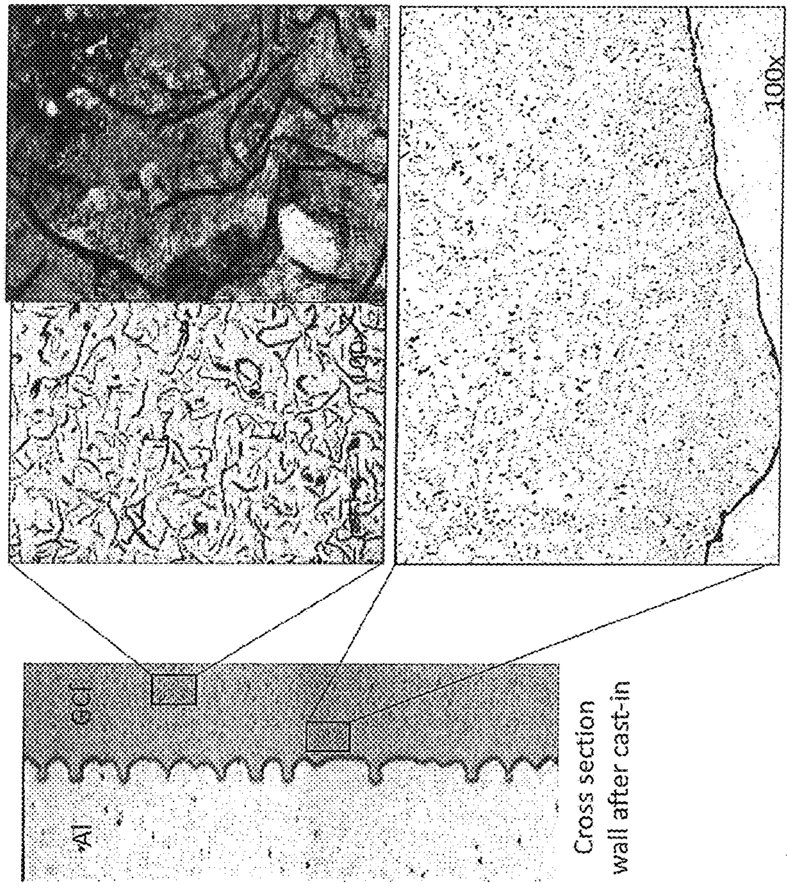
FIG. 5 shows a microstructure of the cylinder liner having as-cast projections according to the present technology. The functional surface area of the cylinder liner is shown at 100× and 500× magnification in FIG. 5*a* and the non-functional surface area of the cylinder liner is shown at 100× magnification in FIG. 5*b*.

FIG. 5 shows a microstructure of the cylinder liner having as-cast projections according to the present technology. The functional area of the cylinder liner is shown at 100× and 500× magnification (see FIG. 5*a*) and has a pearlite matrix with ferrite, carbides, and steadite <5% with a predominantly type A graphite therein (size 4-6), a Rockwell Hardness B Scale (HRB) of 98±3, and an ultimate tensile strength (UTS) of 275±5. The non-functional area of the cylinder liner is shown at 100× magnification (see FIG. 5*b*) and has a pearlite matrix with ferrite, carbides, and steadite <5% with type A, D, and E graphite (size 5-7) therein.

Figure 6:
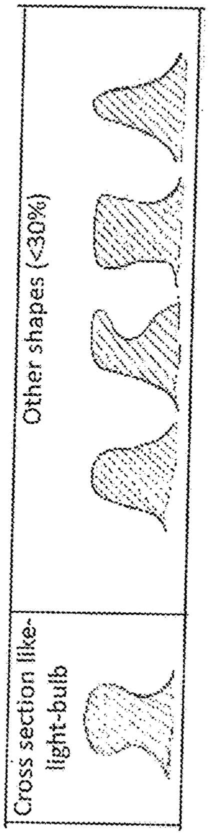
FIG. 6 is a cross-sectional view of the projections formed on the cylinder liner according to an embodiment of the present technology.

FIG. 6 shows the shapes for the projections formed on the cylinder liner according to an embodiment of the present technology. The desired and shape that occupies the majority of the surface of the cylinder liner is a lightbulb shape. Projections having a lightbulb shape are substantially symmetrical. The lightbulb shape as a first diameter adjacent to the surface of the cylinder liner, a second diameter spaced apart from the first diameter and terminating at an end of the projection, and a third diameter therebetween. The third diameter is less than both the first and the second diameters. The second diameter may be greater than or substantially equal to first diameter, as desired. At least about 70% of the projections formed on the cylinder liner have the lightbulb shape. The other about 30% (or less) of the projections formed on the cylinder liner have other shapes also shown in FIG. 6. For example, the other 30% of the projections may have a substantially trapezoidal shape; an arcuate curve shape; an asymmetrical shape having a first diameter adjacent the surface of the cylinder liner, a second diameter spaced apart from the first diameter and terminating at an end of the projection and offset from an longitudinal axis of the projection, and a third diameter therebetween having a diameter less than both the first and second diameters; and a projection having a substantially flat top±inwardly into substantially linear walls extending from the surface. The cylinder liner may also include conjoined (not shown) in a density of about <1/$cm^2$. Each individual projection may have height in the ranges noted hereinabove. For high pressure die casting (HPDC) processes, the projections preferably have a height of 0.7±0.2 mm, and for gravity or low pressure die casting (LPDC) processes, the projections preferably have a height of 0.5±0.2 mm. The projection count (or projection density) according to the various heights and embodiments are from about 18 to about 46 projections/$cm^2$ or from about 120 $in^2$ to about 300 $in^2$. According to an embodiment of the present technology, a preferable projection count is 30±5 projections/$cm^2$. Similarly, the cylinder liner has voids and/or dent spot defects in an area not larger 2.5 $mm^2$ and a depth no lower than 1 mm.

In certain embodiments, a cylinder liner is provided that includes a plurality of as-cast projections formed on an exterior surface thereof, where a portion of the as-cast projections including a member selected from the group consisting of: (a) projections having a lightbulb-like shape with a first diameter adjacent to the surface of the cylinder liner, a second diameter spaced apart from the first diameter and terminating at an end of the projection, and a third diameter therebetween less than the first and the second diameters; (b) conjoined projections, each of the conjoined projections including a plurality of peaks, each peak sharing a shoulder with another peak; (c) vermicular projections, each of the vermicular projections having a cross-section substantially planar to the exterior surface that is non-circular; and (d) combinations thereof. The portion of the as-cast projections can include at least two of (a), (b), and (c). The portion of the as-cast projections can also include each of (a), (b), and (c). The portion of the as-cast projections can include a percentage of the total projections in the plurality of as-cast projections, where the percentage can range from about 1% to about 100%. The portion of the as-cast projections can also include from about 10 as-cast projections per square centimeter to about 100 as-cast projections per square centimeter.

In some embodiments, the present technology provides a cylinder liner that includes a plurality of as-cast projections formed on an exterior surface thereof, where a portion of the as-cast projections are conjoined projections. Benefits of conjoined projections include, but are not limited to, increased resistance to breakage or damage caused by stresses on the projections (as compared to non-conjoined projections) and increased heat transfer between the cylinder liner having the conjoined projections and an engine block due to increase surface area of the cylinder liner providing more area of contact with its surroundings. Each of the conjoined projections includes a plurality of peaks, where each peak shares a shoulder with another peak. As desired, the projections of the conjoined peaks may not have a circumferential constriction therearound, or fewer than all of the conjoined peaks may have a circumferential constriction. The portion of the as-cast projections being conjoined projections can include about one-quarter of a total number of the plurality of as-cast projections, about one-half of a total number of the plurality of as-cast projections, about three-quarters of a total number of the plurality of as-cast projections, and substantially all of the plurality of as-cast projections. The conjoined projections can include conjoined projections having at least three peaks, at least four peaks, and more than four peaks. The plurality of peaks can vary in height by less than about 25% and can have a substantially similar height. The plurality of peaks can have a height from about 0.25 mm to about 0.75 mm. The plurality of peaks may have a height less than about 0.5 mm, and/or in a range of about 0.3 mm to about 0.48 mm. A lowest point of the shoulder shared between the peak and the another peak can include about one-quarter of a height of one of the peak and the another peak, can include about one-half of a height of one of the peak and the another peak, and can include about three-quarters of a height of one of the peak and the another peak. The plurality of as-cast projections can include from about 10 as-cast projections per square centimeter to about 100 as-cast projections per square centimeter. Likewise, the portion of the as-cast projections being conjoined projections can include from about 10 conjoined projections per square centimeter to about 100 conjoined projections per square centimeter. The as-cast projections being conjoined projections may be 10 conjoined projections or more per square centimeter, 60 conjoined projections or more per square centimeter, 100 conjoined projections or fewer per square centimeter, between about 20 and about 80 conjoined projections per square centimeter, between about 60 and about 90 conjoined projections per square centimeter or the like.

In various embodiments, the present technology provides a cylinder liner that includes a plurality of as-cast projections formed on an exterior surface thereof, where a portion of the as-cast projections are vermicular shapes. Each of the vermicular shapes has a cross-section substantially planar to the exterior surface that is non-circular. The cross-section can be multi-lobed and can be elongate and curved. Examples of such cross-sections include C-shapes, S-shapes, kidney shapes, multi-lobed shapes including shapes having two lobes, three lobes, four lobes, and more than four lobes, shapes having multiple curves and turns including various sinuous and winding shapes. The portion of the as-cast projections being vermicular shapes can include about one-quarter of a total number of the plurality of as-cast projections, about one-half of a total number of the plurality of as-cast projections, about three-quarters of a total number of the plurality of as-cast projections, and substantially all of the plurality of as-cast projections. The portion of the as-cast projections being vermicular shapes can have a substantially similar height and can have a height from about 0.25 mm to about 0.75 mm. The vermicular shape can have a single peak and can include where the vermicular shape has a substantially constant height. The plurality of as-cast projections can include from about 10 as-cast projections per square centimeter to about 100 as-cast projections per square centimeter. Likewise, the portion of the as-cast projections being vermicular shapes can include from about 10 vermicular shapes per square centimeter to about 100 vermicular shapes per square centimeter.

Figure 8:
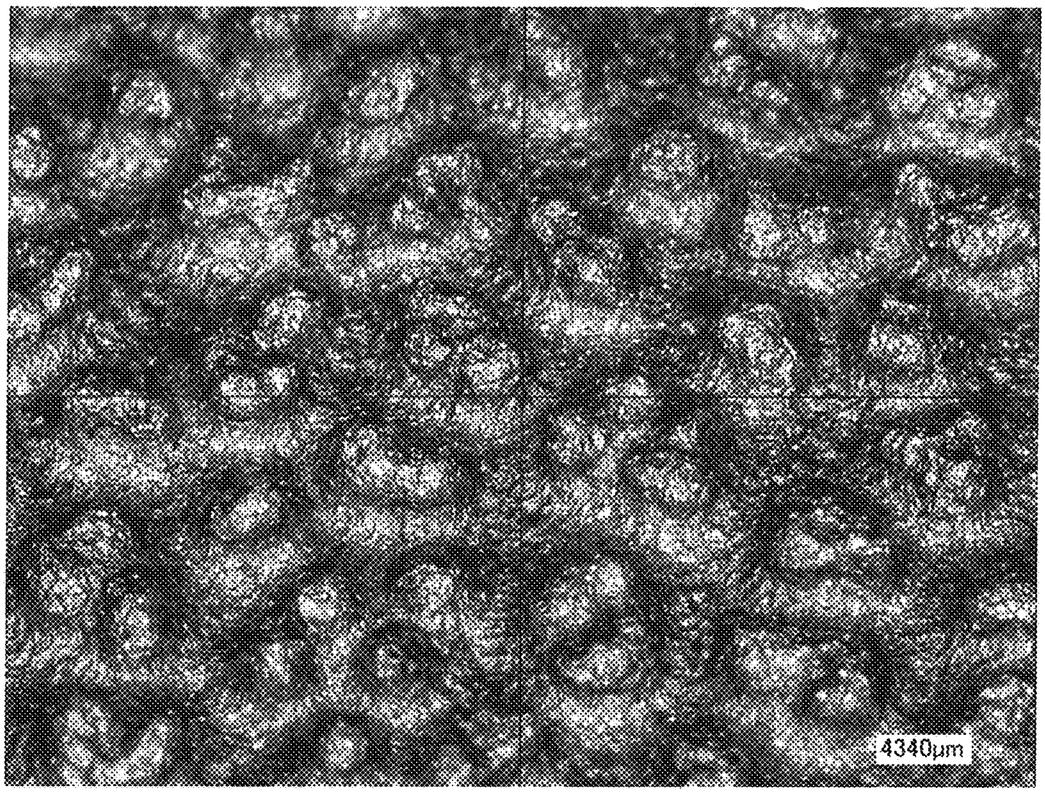
FIG. 8 is a photomicrograph of an exterior surface of a cylinder liner formed in accordance with the present technology.
Figure 9:
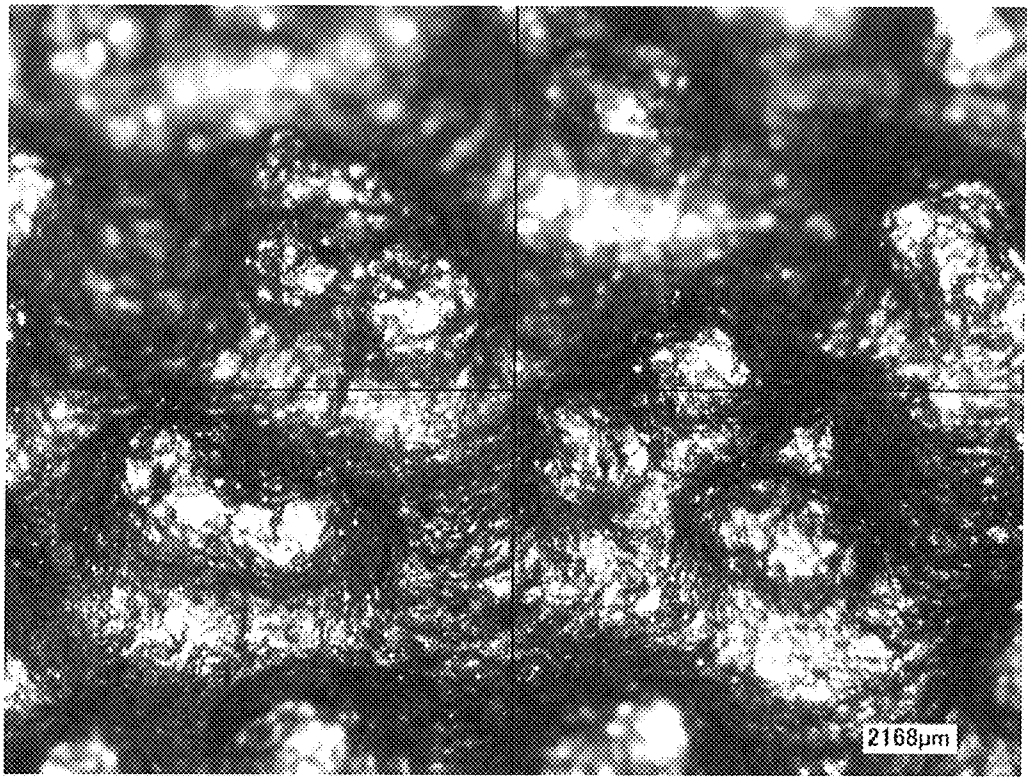
FIG. 9 is photomicrograph of the central portion of FIG. 8 at a higher magnification.

Examples of a cylinder liner having a plurality of as-cast projections formed on an exterior surface thereof are shown in FIGS. 8-9, where the as-cast projections include projections having a lightbulb-like shape, conjoined projections, and vermicular projections. The methods of forming a cylinder liner having as-cast projections as described herein can be tailored to optimize the physical parameters of the as-cast projections, the shape or type of the as-cast projections, and the number and portions of shapes or types of the as-cast projections on the exterior surface of the cylinder liner. FIG. 8 is a photomicrograph of the exterior surface of the cylinder liner and FIG. 9 is photomicrograph of the central portion of FIG. 8 at a higher magnification. Examples of projections having lightbulb-like shapes are shown in FIGS. 2, 3*a*, 6, and 8. Examples of conjoined projections are shown in FIGS. 8 and 9. Examples of vermicular projections are shown in FIGS. 8 and 9.

Figure 10:
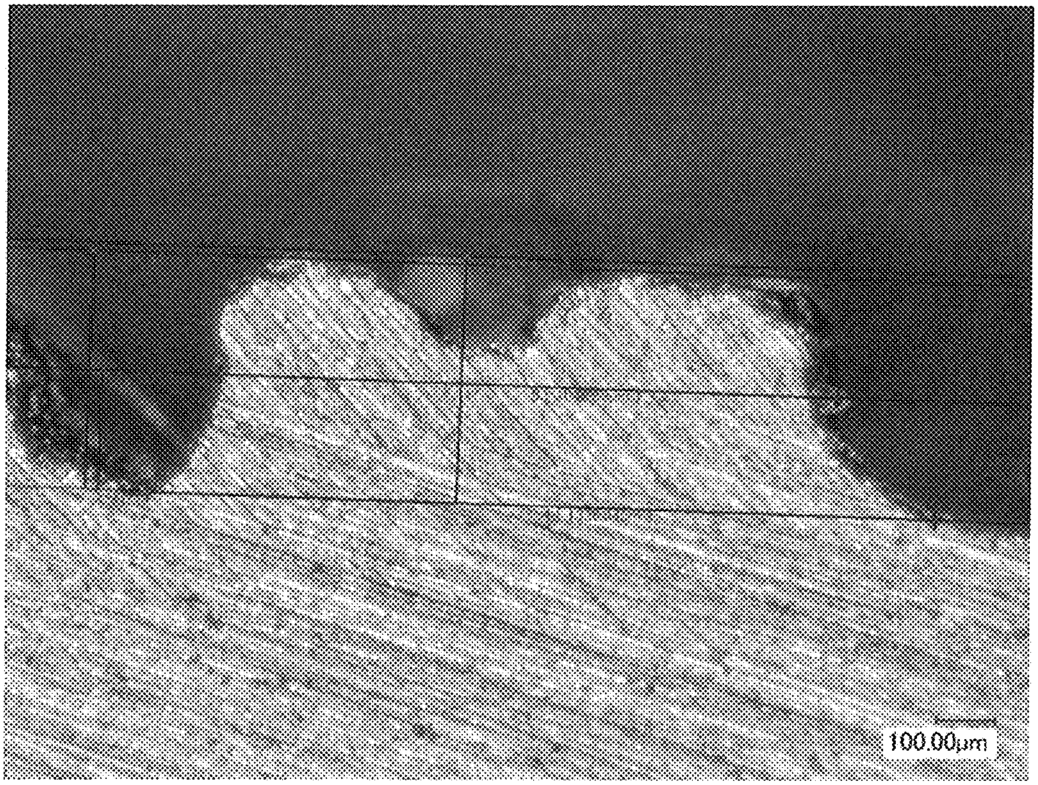
FIG. 10 is a photomicrograph of a vertical cross-section of a conjoined projection.
Figure 11:
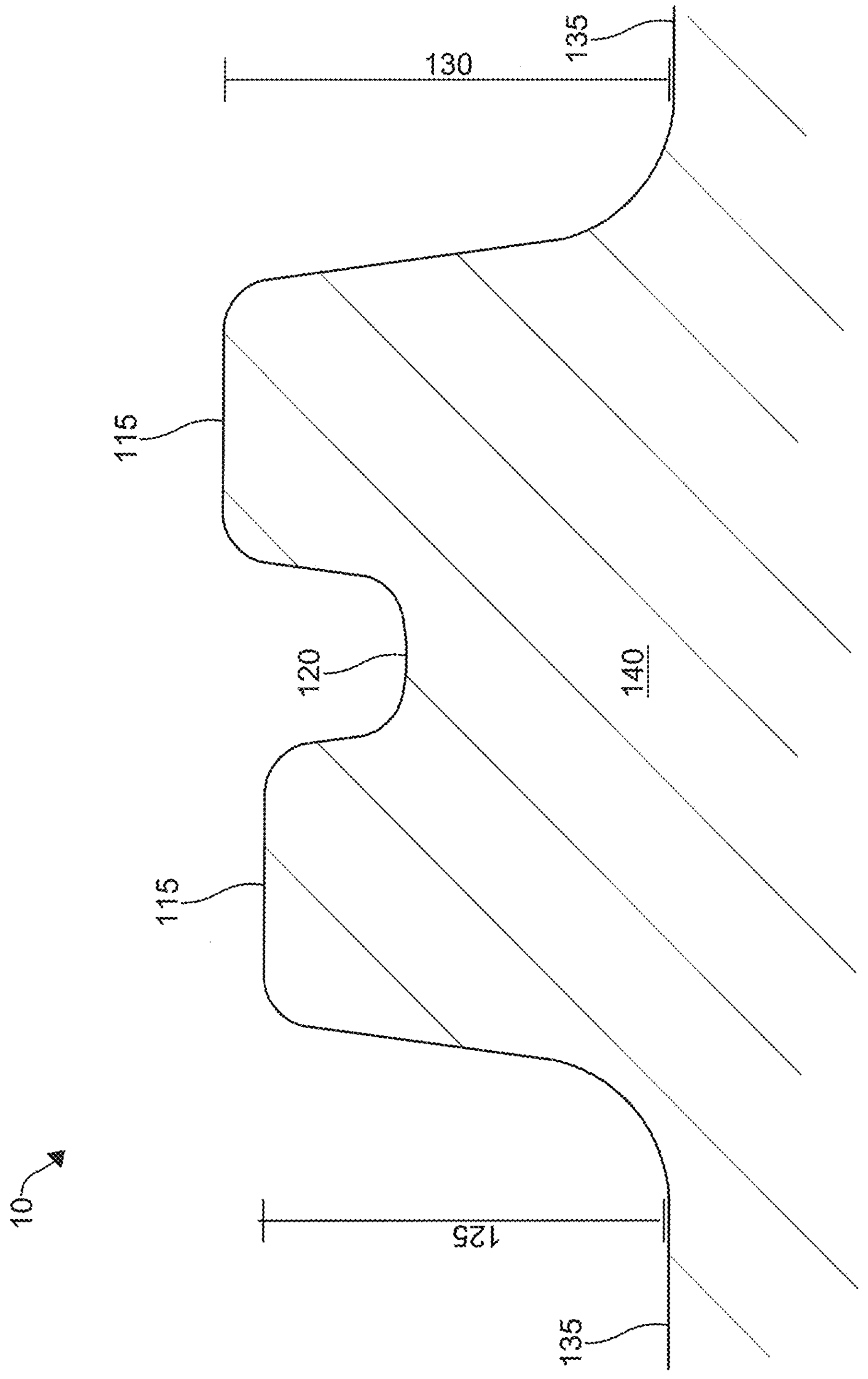
FIG. 11 is a schematic thereof illustrating various aspects of the conjoined projection of FIG. 10.

FIG. 10 is a photomicrograph of a vertical cross-section of a conjoined projection, where FIG. 11 is a schematic thereof illustrating various aspects of the conjoined projection at 110. The vertical cross-section of the conjoined projection 110 shows two peaks 115 that share a shoulder 120. The two peaks 115 have substantially similar heights 125, 130 in projecting from the exterior surface 135 of the cylinder liner 140. However, the peaks 115 could have different heights and/or one or both of the peaks 115 could share one or more shoulders 120 with one or more peaks 115 having different heights. The shoulder 120 shown between the peaks 115 is about three-quarters of the height 125, 130 of one of the peaks 115. The shoulder 120, however, could also have a height ranging between about 10% to about 90% of the height 125, 130 of one of the peaks 115.

Figure 12:
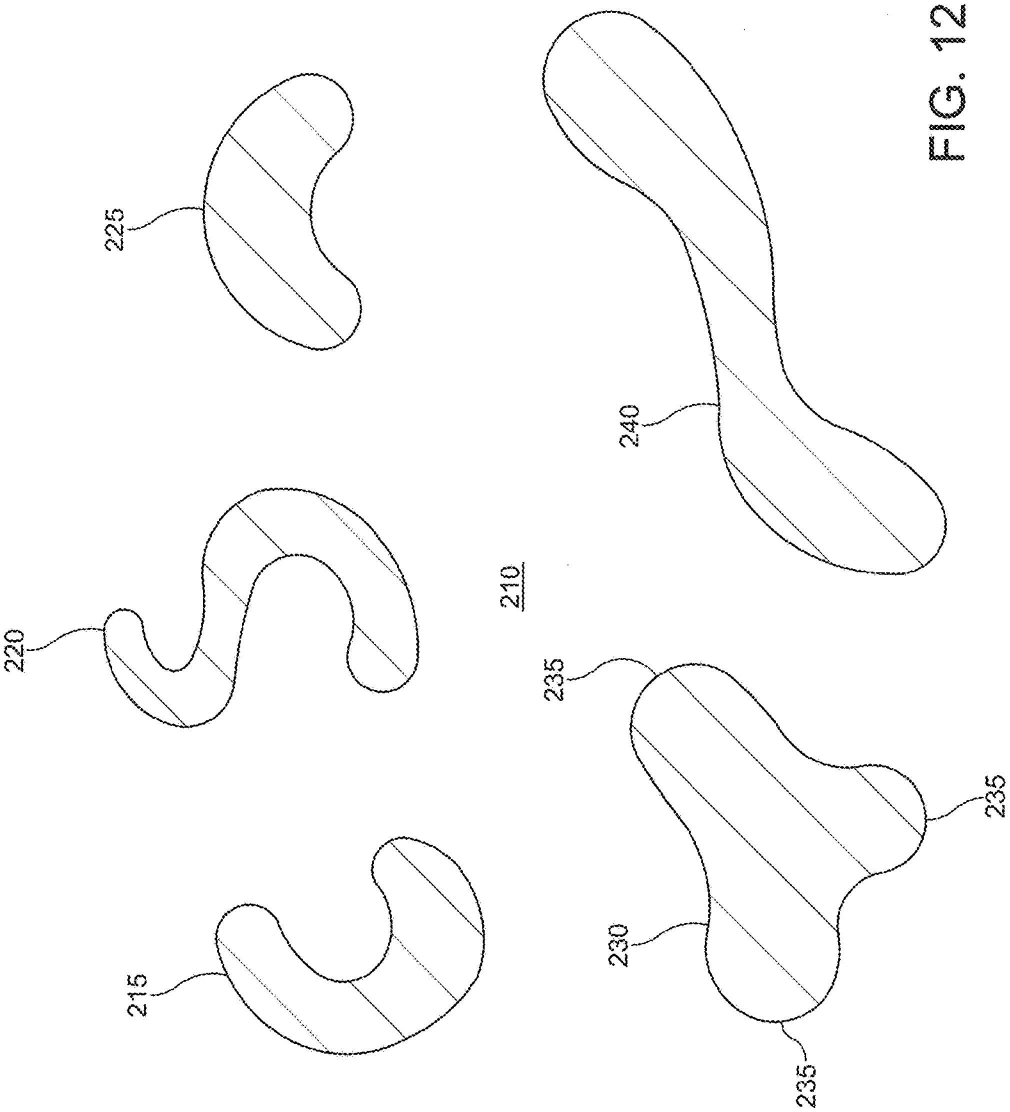
FIG. 12 is a schematic of various cross-sections of vermicular projections taken substantially planar to the exterior surface of the cylinder liner.

FIG. 12 is a schematic of various cross-sections of vermicular projections taken substantially planar to the exterior surface of the cylinder liner showing the non-circular shape thereof. The exterior surface 210 of the cylinder liner includes cross-sections of vermicular projections that are C-shaped 215, S-shaped 220, kidney shaped 225, multi-lobed 230 having three lobes 235, and a shape 240 having multiple turns and curves. It is noted that the cross-section of a vermicular projection can have a shape that is different from the examples shown in the figure with the caveat that the cross-section is non-circular.

The advantages of a cylinder liner having the as-cast projections according to the present technology as compared to those of the prior art (most specifically over cylinder liners having a threaded exterior) can include the following:

- low inter-bore distance for compacted engines;
- extremely higher clamping performance (bonding and shear strength);
- gap-free technology (no air gaps between the engine block and the cylinder liner);
- better heat transfer capability (lower bore distortion/less friction in the system);
- recommended for all Al-block casting manufacturing process;
- optimized durability and strength of projections; and
- increased surface area of as-cast projections optimizing heat transfer between cylinder liner and engine block.

Further improvements may be seen in the cylinder liner if an interior surface thereof is machined, honed, or otherwise modified. One honing process and surface specifications that may be utilized and incorporated with a cylinder liner as described herein is disclosed in commonly-owned U.S. patent application Ser. No. 14/608,164 filed on Jan. 28, 2015, where the entire disclosure is incorporated herein by reference.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

From the foregoing description, one ordinarily skilled in the art can easily ascertain the essential characteristics of this invention and, without departing from the spirit and scope thereof, can make various changes and modifications to the invention to adapt it to various usages and conditions.

I claim:

1. A cylinder liner comprising:

a plurality of as-cast projections formed on an exterior surface thereof, the plurality of as-cast projections including the following portions of projections:

(a) projections having a lightbulb-like shape, each of the projections having a lightbulb-like shape including a first diameter adjacent to the surface of the cylinder liner, a second diameter spaced apart from the first diameter and terminating at an end of the projection, and a third diameter therebetween less than the first and the second diameters;

(b) conjoined projections, each of the conjoined projections including a plurality of peaks, each peak sharing a shoulder with another peak; and (c) vermicular projections, each of the vermicular projections having a non-circular cross-section substantially planar to the exterior surface, the vermicular projections including one of a C-shaped non-circular cross-section substantially planar to the exterior surface and an S-shaped non-circular cross-section substantially planar to the exterior surface.

2. The cylinder liner of claim 1, wherein the portion of the as-cast projections being conjoined projections includes one-quarter of a total number of the plurality of as-cast projections.

3. The cylinder liner of claim 1, wherein the portion of the as-cast projections being conjoined projections includes one-half of a total number of the plurality of as-cast projections.

4. The cylinder liner of claim 1, wherein the portion of the as-cast projections being conjoined projections includes three-quarters of a total number of the plurality of as-cast projections.

5. The cylinder liner of claim 1, wherein the conjoined projections include conjoined projections having at least three peaks.

6. The cylinder liner of claim 1, wherein the conjoined projections include conjoined projections having at least four peaks.

7. The cylinder liner of claim 1, wherein the plurality of peaks vary in height by less than 25%.

8. The cylinder liner of claim 1, wherein the plurality of peaks have a substantially similar height.

9. The cylinder liner of claim 1, wherein the plurality of peaks have a height from 0.25 mm to 0.75 mm.

10. The cylinder liner of claim 1, wherein a lowest point of the shoulder shared between the peak and the another peak includes one-quarter of a height of one of the peak and the another peak.

11. The cylinder liner of claim 1, wherein a lowest point of the shoulder shared between the two peaks includes one-half of a height of one of the peak and the another peak.

12. The cylinder liner of claim 1, wherein a lowest point of the shoulder shared between the two peaks includes three-quarters of a height of one of the peak and the another peak.

13. The cylinder liner of claim 1, wherein the plurality of as-cast projections includes from 10 as-cast projections per square centimeter to 100 as-cast projections per square centimeter.

14. The cylinder liner of claim 1, wherein the portion of the as-cast projections being conjoined projections includes from 10 conjoined projections per square centimeter to 100 conjoined projections per square centimeter.

15. The cylinder liner of claim 1, wherein the non-circular cross-section is multi-lobed.

16. The cylinder liner of claim 1, wherein the non-circular cross-section is elongate and curved.

17. The cylinder liner of claim 1, wherein the portion of the as-cast projections being vermicular projections includes one-quarter of a total number of the plurality of as-cast projections.

18. The cylinder liner of claim 1, wherein the portion of the as-cast projections being vermicular projections includes one-half of a total number of the plurality of as-cast projections.

19. The cylinder liner of claim 1, wherein the portion of the as-cast projections being vermicular projections includes three-quarters of a total number of the plurality of as-cast projections.

20. The cylinder liner of claim 1, wherein the portion of the as-cast projections being vermicular projections have a substantially similar height.

21. The cylinder liner of claim 1, wherein the portion of the as-cast projections being vermicular projections have a height from 0.25 mm to 0.75 mm.

22. The cylinder liner of claim 1, wherein the plurality of as-cast projections includes from 10 as-cast projections per square centimeter to 100 as-cast projections per square centimeter.

23. The cylinder liner of claim 1, wherein the portion of the as-cast projections being vermicular projections includes from 10 vermicular projections per square centimeter to 100 vermicular projections per square centimeter.

24. A cylinder liner comprising:

a plurality of as-cast vermicular projections formed on an exterior surface thereof, each of the as-cast vermicular projections having a non-circular cross-section substantially planar to the exterior surface, the as-cast vermicular projections including one of a C-shaped non-circular cross-section substantially planar to the exterior surface and an S-shaped non-circular cross-section substantially planar to the exterior surface;

wherein the as-cast vermicular projections have a substantially similar height from 0.25 mm to 0.75 mm.

25. A cylinder liner comprising:

a plurality of as-cast vermicular projections formed on an exterior surface thereof, each of the as-cast vermicular projections having a non-circular cross-section substantially planar to the exterior surface, the as-cast vermicular projections including one of a C-shaped non-circular cross-section substantially planar to the exterior surface and an S-shaped non-circular cross-section substantially planar to the exterior surface;

wherein the as-cast vermicular projections include from 10 as-cast vermicular projections per square centimeter to 100 as-cast vermicular projections per square centimeter.

* * * * *